United States Patent [19]

Hunter et al.

[11] Patent Number: 5,110,071
[45] Date of Patent: May 5, 1992

[54] PERSONNEL CAPSULE EXTRACTION APPARATUS

[75] Inventors: Henry J. Hunter, Lancaster; Clifton W. Marshall, Campo; Kenneth Cunningham; Marvin A. Tingdahl, both of Lancaster, all of Calif.

[73] Assignee: The United States of America as Represented by the Secretary of the Air Force, Washington, D.C.

[21] Appl. No.: 510,657

[22] Filed: Apr. 18, 1990

[51] Int. Cl.⁵ ..................... B64D 01/12; B64D 01/14
[52] U.S. Cl. ................................... 244/137.3; 244/140
[58] Field of Search ............... 244/138 R, 152, 137.2, 244/137.3, 118.2, 140

[56] References Cited

U.S. PATENT DOCUMENTS

| | | | |
|---|---|---|---|
| 2,120,477 | 6/1938 | Adams | 244/140 |
| 2,973,172 | 2/1961 | Bixby | 244/138 R |
| 3,050,278 | 8/1962 | Gardner et al. | 244/138 |
| 3,401,905 | 9/1968 | Rohlick | 244/152 |
| 3,625,461 | 12/1971 | Guienne | 244/138 R |

FOREIGN PATENT DOCUMENTS 1180336  6/1959  France ................. 102/377

OTHER PUBLICATIONS

Hunter, "Aerial Delivery of Personnel in Ground Poximity" Mar. 1989.

Primary Examiner—Joseph F. Peters, Jr.
Assistant Examiner—Virna Lissi Mojica
Attorney, Agent, or Firm—Irwin P. Garfinkle; Donald J. Singer

[57] ABSTRACT

A personnel capsule extraction apparatus having a personnel capsule mounted on extraction platform which is ejected from a low flying aircraft at an altitude between five and ten feet above the ground. A drogue parachute is utilized to deploy a large extraction parachute which pulls the personnel capsule out of the aircraft.

8 Claims, 3 Drawing Sheets

PERSONNEL CAPSULE EXTRACTION APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an extraction apparatus, and in particular to a low altitude personnel capsule extraction apparatus.

Ever since parachutes have been used in airborne assault, the Army and the Air Force have been plagued by three chronic problems: (1) vulnerability of the airdrop aircraft to ground based small arms fire as it flies 600 to 1,000 feet above the combat drop zone at the relatively slow speed of 130 knots; (2) vulnerability of the paratroops as they exit the aircraft and during a relatively slow descent for 20 to 30 seconds; and (3) dispersion of the paratroops after exiting the aircraft 150 to 200 feet apart, and the resultant loss of control on the drop zone due to this dispersion. Thus, recognizing a need to reduce these risks, both services have been working on several airdrop systems since the early 1960s.

Of these systems, the low-altitude parachute extraction system (LAPES), has been widely used since 1970 for cargo aerial deliveries. Another system, the ground-proximity extraction system (GPES), which utilizes ground-based arrester cables as a means of deceleration, was tested with a personnel capsule, but has only been used as a last resort for arresting aircraft when their primary braking systems have failed. However, the LAPES was never mated with the personnel capsule. There were two good reasons why this was never done: (1) The LAPES hardware and rigging procedures were still being developed at the time of the GPES testing, and (2) the results from the concurrent GPES testing showed objectionably high impact g-forces on the instrumented capsule and anthropomorphic dummies inside.

Currently the Army is looking for ways to land airborne troops so as to reduce the time they are vulnerable to enemy small arms fire. The present invention is intended to satisfy that need. By coming in at tree top level, a C-130 aircraft would avoid most of the ground-to-air fire. In addition, the use of a personnel capsule to carry troops substantially reduces the risk of them becoming targets for small arms fire from the ground, since the personnel are never descending by parachute. A secondary advantage over normal airborne airdrops from 600-1000 feet is that a personnel capsule will hold 12 to 24 men, thus when they land they are already formed in squads with ammo available immediately, and thus ready to fight a squad-sized unit, rather than being dispersed as in normal personnel airdrops over an area of several acres. This invention is also feasible for use in amphibious operations by rigging boats onto the LAPES airdrop platforms which would be extracted 5 to 10 feet above the water, from C-130 type aircraft, similar to the extraction on land.

SUMMARY OF THE INVENTION

The present invention utilizes large parachutes to extract a personnel-carrying capsule from the aft cargo ramp of a cargo airplane that is flying from 5 to 10 feet above the ground. The low altitude parachute extraction system is used to eject a personnel capsule from a low flying aircraft and to decelerate the capsule until it contacts the ground and slides to a stop.

This apparatus eliminates or greatly reduces personnel vulnerability to the ground-to-air fire since they are never more than 10 ft above the ground and travelling at a high speed horizontally (a very difficult target). They are together in a capsule and ready to fight as a squad as soon as the capsule is brought to a stop by the large decelerator parachute(s). The personnel capsule is extracted from a cargo airplane flying at 120 to 130 knots 5 to 10 feet over the ground. Since the capsule is extracted or decelerated, i.e., the aircraft moves out from under the capsule, at a speed of 30 to 40 knots. By the time the capsule contacts the ground, it has been decelerated by another 30 to 40 knots for a total of 60 to 80 knots less than the airdrop aircraft speed of 120-130 knots. Therefore, when the capsule (which is mounted on a LAPES platform) contacts the ground, it has already been decelerated to 60 to 70 knots by the large deceleration parachutes. The capsule is equipped with roll bars and has a very low center of gravity, thus further reducing any chance of injury due to rolling at high speed. The capsule comes to a stop after a slide of about 600 to 800 feet and the troops who are strapped in, release their straps, grab their weapons, and are ready to fight.

It is one object of the present invention, therefore, to provide an improved low altitude personnel capsule extraction apparatus.

It is another object of the invention to provide an improved personnel capsule extraction apparatus which extracts a personnel carrying capsule from an aircraft that is flying from five to ten feet above the ground.

It is yet another object of the invention to provide an improved personnel capsule extraction apparatus in which twelve to twenty-four men are contained in squads within the drop zone.

It is an even further object of the invention to provide an improved personnel capsule extraction apparatus in which boats are attached to the drop platforms for use in amphibious operations.

It is still another object of the invention to provide an improved personnel capsule extraction apparatus in which the vulnerability of the troops to enemy small fire is greatly reduced.

These and other advantages, objects and features of the invention will become more apparent after considering the following description taken in conjunction with the illustrative embodiment in the accompanying drawings.

BRIEF DESCRIPTION OF THE PREFERRED EMBODIMENT

Figure 1A:
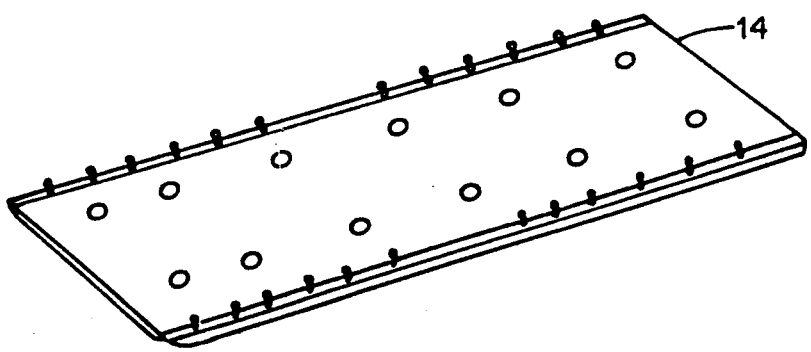
FIGS. 1a-1f are a perspective view of different portions of the personnel capsule extraction apparatus according to the present invention.
Figure 1B:
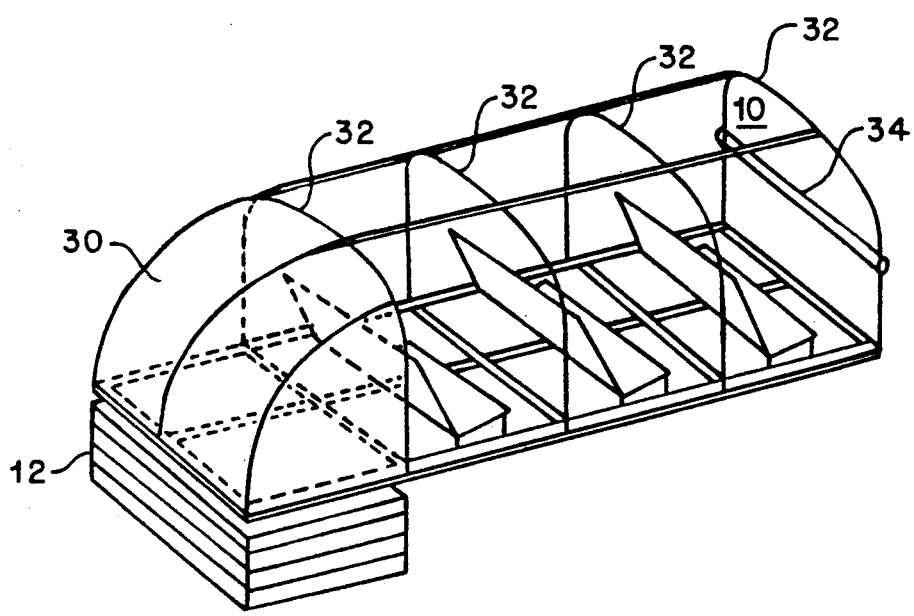
Figure 1C:
Figure 1D:
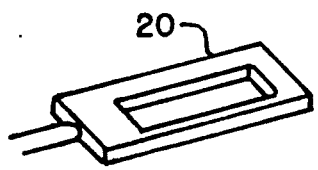
Figure 1E:
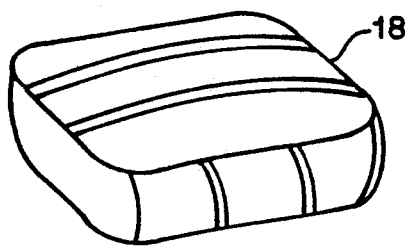
Figure 1F:
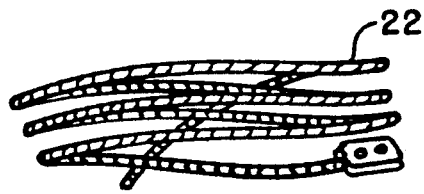

Referring now to FIG. 1, there is shown the basic components of the personnel capsule extraction apparatus. The major component is the personnel capsule 10 which is shown on a representative stack of paper honeycomb material 12. In operation four stacks of paper honeycomb material 12 would be utilized. A standard Air Force low altitude parachute extraction system (LAPES) airdrop platform 14 is utilized as a base for the personnel capsule 10. The personnel capsule extraction apparatus utilizes a small drogue parachute 16 and a large extraction parachute 18. The drogue parachute 16 is approximately fifteen to twenty-two feet in diameter and is contained in a deployment bag. The extraction parachute 18 is also contained in a deployment bag and its size and number are determined by the specific characteristics of the personnel capsule/platform combination, such as size, weight etc. The connecting link between the drogue parachute 16 and the extraction parachute 18 is the tow plate device 20. The two plate device 20 is attached to the parachute lines of the drogue chute and to the deployment bag of the extraction parachute. The tow plate device 20 is also removably attached to the floor of the cargo aircraft wherein it may be released either mechanically or electrically (or by any other suitable method) by either the cargo loadmaster or the pilot. Nylon webbing lines 22 are utilized to connect the extraction parachute 18 to the personnel capsule 10.

Figure 2A:
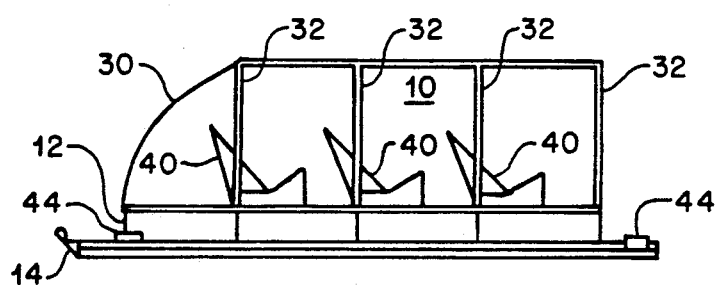
FIGS. 2a, 2b and 2c are side, top and end views respectively of the personnel capsule mounted on a standard low altitude parachute extraction system (LAPES) platform.
Figure 2B:
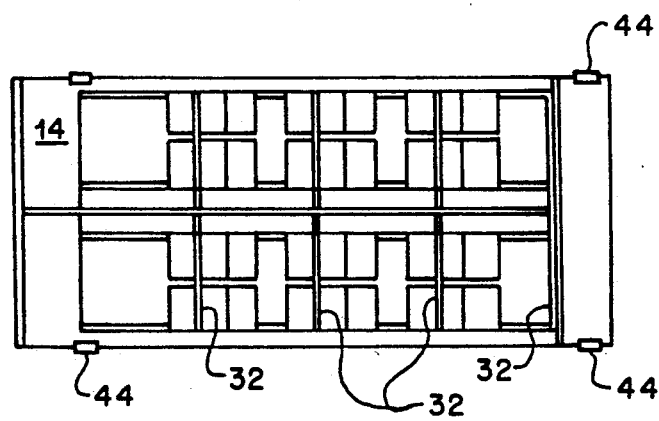
Figure 2C:
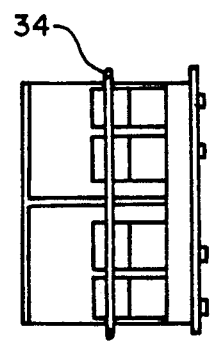

Turning now to FIGS. 2a, 2b and 2c there is shown a personnel capsule 10 which is mounted on a standard LAPES platform 14. The personnel capsule 10 may be fabricated with a frame of steel or aluminum or any other suitable material and includes a plexiglass windshield 30. In this example, a steel (or aluminum) and plexiglass capsule approximately 16 ft by 8 ft is restrained by any commercially available conventional means on top of a standard Air Force metric LAPES platform measuring 20 feet by 9 feet. The flat undersurface of the capsule is separated from the uppersurface of the LAPES platform by a crushable paper honeycomb material to attenuate some of the initial ground impact shock. The seats 40 in the capsule are aft facing and inclined so that a seated trooper's back would be approximately at a 45 degree angle with the surface of the platform. Seating is four across in three rows. The seats 40 would be molded fiberglass and padded with shoulder and waist straps, which come to a single quick disconnect fitting similar to that used in the T-10 personnel parachute harness. The LAPES extraction web would be rigged as for cargo LAPES deliveries with an attitude control bar 34 as an integral part of the personnel capsule. LAPES extraction brackets 44 are positioned as shown.

For use the capsule would be restrained to a 20 ft long LAPES platform, and separated from it by 4 layers of paper honeycomb material. Sufficient restraint straps would be used to satisfy standard LAPES airdrop criteria. When ready for an airdrop, the personnel capsule/platform is loaded on the aircraft and the aircraft siderail restraint locks are engaged once the platform is in position. The extraction webs are positioned and the extraction parachutes and lines are rigged. When the rigging has been checked, the troops are then loaded and restrained. A further check is made to insure that the troops are properly positioned in their restraint harnesses. The rigging of the system is again check and the aircraft takes off. The loadmasters go through their various checks, the doors are opened, and at the right time and place the LAPES delivery is made.

Figure 3A:
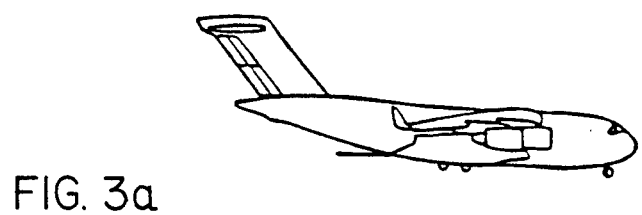
FIGS. 3a-3f are a pictorial representation of the sequence of operation of the personnel capsule extraction apparatus.
Figure 3A:
Figure 3B:
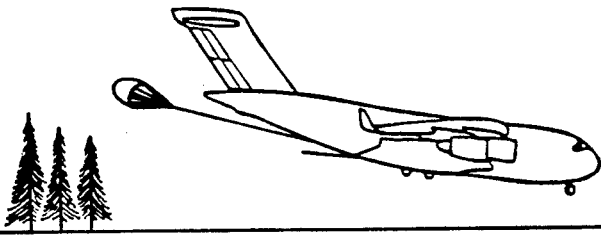
Figure 3C:
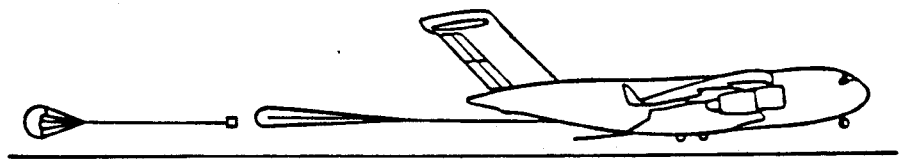
Figure 3D:
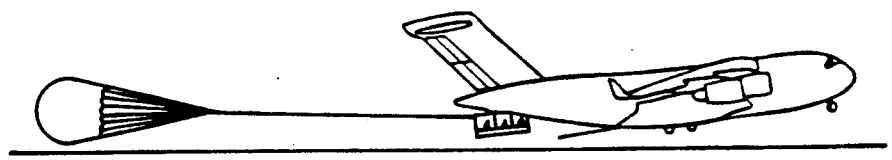
Figure 3E:
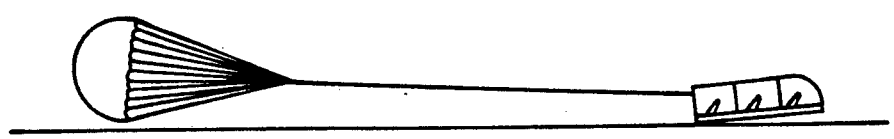
Figure 3F:
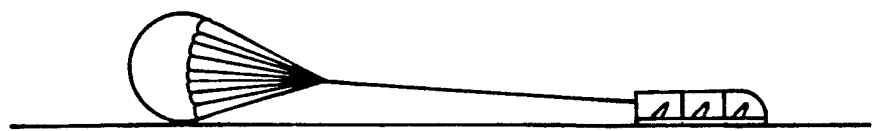

The personnel capsule airdrop sequence is as follows:

The airdrop aircraft (FIG. 3a) approaches the drop zone at tree top level with aft cargo doors open. A small drogue chute which is restrained within the aircraft, is deployed at the edge of the drop zone (FIG. 3b) and the aircraft immediately descends to approximately five to ten feet above the ground. In FIG. 3a, the small drogue chute is released from the aircraft and it deploys larger extractor parachutes to which it is attached. In two to three seconds the extractor chutes are fully deployed and are filling with air. The resulting drag force of the extractor chutes causes the platform siderail locks on the aircraft to release (FIG. 3d) and the platform/personnel capsule is decelerated as the aircraft flies on at 120 to 130 knots. Thus, the floor of the aircraft moves forward from under the platform and Platform/personnel capsule is extracted. As the extractor chute continues to decelerate the platform (FIG. 3e), it flies in a low trajectory in a slightly nose up attitude until it contacts the ground and slides out to a stop (FIG. 3f). The troops would then release their restraint straps and exit the side of the capsule with their weapons.

The advantages of the personnel capsule LAPES method of personnel airdrop over the old method of individuals jumping from an airplane at 600 to 1000 feet altitude are as follows.

1. The personnel capsule is not exposed to enemy small arms fire from the ground as they are when jumping out of an aircraft and while descending on a parachute for 20 to 40 seconds at a relatively slow rate of descent (15 to 20 ft/sec). The personnel capsule would be travelling at 50 to 100 ft/sec. horizontally and would be a much harder target to hit.

2. The squad would land together as a fighting unit and be under the instant control of the squad leader. The troops would not be dispersed over several hundred yards as is the case of individual descent.

3. Heavier weapons and additional ammunitions may be carried on the capsule with the men.

The two major features of he system are not new in concept. The LAPES system for cargo airdrops has been in use since 1964 and a personnel capsule was tested by the coinventors in 1965. What is new is the combining of the two systems, i.e., the use of LAPES with the personnel capsule. Engineering of the complete system and design of the capsule, including optimum body position for the troops and design of the capsule are unique. Finally, the application to waterlanding using a life boat type craft restrained to a LAPES platform is an additional use. The use of larger parachutes (35 ft dia. or 64 ft dia. in lieu of the standard 28 ft dia.) to provide a more even distribution of deceleration energy over the total time of the airdrop. These are all features of the system which made it feasible and that were not included in the 1965 Personnel Capsule tests. The acceleration vs time measurements taken from the February 1987 test, show that a maximum acceleration of 10.5 G was recorded by instrumentation placed in an anthropometric dummy riding on the test platform. The duration of the acceleration was demonstrated to be of very short duration (0.02 to 0.04 sec).

In addition to the drop zone and beachhead (water landing 50–100 yards off shore) mentioned above, the system may be applied with capsules constructed of airfilled compartments. Although this is feasible the coinventors have not built a prototype or tested to see if the personnel could be adequately restrained.

A specific embodiment of the personnel capsule which is shown in FIGS. 2a, 2b and 2c, is herein presented. The personnel capsule is constructed of steel beams, an aluminum floor and seats, ad steel roll bars. The capsule as a unit would be placed on four stacks of paper honeycomb material and restrained to the Type V platform with 9,5000 pound capacity Type X nylon tiedown straps and devices. Two four-ply Type XXVI nylon extraction bridles would be attached at the forward end of the platform, routed through the attitude control bar at the aft end of the capsule, then brought together approximately one capsule length behind the platform. An eight-ply Type XXVI nylon extraction riser would be attached at this point. The extraction/deceleration chutes would be two G-12 parachutes with a 60 foot long extraction riser. The G-12 parachutes would be deployed by a 22 foot $D_O$RS parachute. Using two 28 foot $D_O$RS parachutes (or larger clusters up to four chutes) for LAPES application is a poor choice that has been perpetrated for the past 18 years. Chutes with higher drag coefficients than the 28 foot $D_O$RS (such as the 64 foot $D_O$FC G-12 or the 35 foot $D_O$SS) would decelerate the sliding platform more efficiently at the slower speeds after touchdown and may be initially reefed for extraction at the higher speeds. The G-12 parachute is inherently slow to inflate at 130 kias and therefore does not need reefing.

Although the invention has been described with reference to a particular embodiment, it will be understood to those skilled in the art that the invention is capable of a variety of alternative embodiments within the spirit and scope of the appended claims.

What is claimed is:

1. A personnel capsule extraction apparatus comprising in combination means for containing and enclosing personnel, said personnel containing and enclosing means includes a base platform with a plurality of seats arranged thereon and operatively attached to said base platform, said base platform having a first and second end, a plurality of roll bars operatively attached to said base platform and substantially equally-spaced along the length of said base platform, said roll bar being reinforced with a plurality of connecting members which are orthogonal to said plurality of roll bars and equally-spaced thereon, a windshield operatively attached to said base platform and one of said roll bars, said windshield located at said first end of said base platform, and an altitude control bar operatively attached to one of said roll bars at said second end of said base platform, said altitude control bar is positioned parallel to said base platform, an airdrop platform to support said personnel containing and enclosing means, said personnel containing and enclosing means operatively attached to said airdrop platform, means for absorbing shock, said shock absorbing means uniformly spaced between said personnel containing and enclosing means and said airdrop platform, said shock absorbing means absorbing any shock which is transmitted to said personnel containing and enclosing means when said airdrop platform impacts the ground, and, means for extracting, said extracting means operatively attached to said personnel containing and enclosing means, said extracting means extracting said personnel containing and enclosing means from a low flying aircraft, said extracting means being activated by an aircraft crew member to extract said personnel containing and enclosing means at a predetermined height above the ground.

2. A personnel capsule extraction apparatus as described in claim 1 wherein said predetermined height is in the range of five to ten feet above the ground.

3. A personnel capsule extraction apparatus as described in claim 1 wherein said extracting means comprises a drogue parachute operatively attached to an extraction parachute.

4. A personnel capsule extraction apparatus as described in claim 1 wherein said shock absorbing means comprises a plurality of honeycomb material stacks.

5. A personnel capsule extraction apparatus as described in claim 1 wherein said plurality of seats provides seating for twelve armed troops.

6. A personnel capsule extraction apparatus as described in claim 4 wherein said honeycomb material comprises paper.

7. A personnel capsule extraction apparatus as described in claim 1 wherein said plurality of honeycomb material stacks comprises four.

8. A personnel capsule extraction apparatus as described in claim 4 wherein said honeycomb material stacks comprises four layers.

* * * * *